United States Patent [19]

Jennings et al.

[11] 4,220,198
[45] Sep. 2, 1980

[54] BRACKET APPARATUS

[76] Inventors: James M. Jennings, 3211 Wickersham Ct., Orlando, Fla. 32806; Nicholas S. Pazar, 244 Sylvan Dr., Winter Park, Fla. 32789

[21] Appl. No.: 902,728

[22] Filed: May 3, 1978

[51] Int. Cl.² ............................................. F28F 9/06
[52] U.S. Cl. .................................. 165/67; 248/DIG. 9
[58] Field of Search ........................ 165/55, 76, 67; 248/58–68 R, DIG. 9; 312/229; 62/285, 291

[56] References Cited

U.S. PATENT DOCUMENTS

| | | | |
|---|---|---|---|
| 2,876,631 | 3/1959 | Bailey | 62/285 |
| 3,018,639 | 1/1962 | Bailey | 62/285 |
| 3,240,456 | 3/1966 | Hartman | 248/68 R |
| 3,367,132 | 2/1968 | Elliott | 62/285 |
| 3,398,786 | 8/1968 | McNabney | 165/55 |

*Primary Examiner*—Samuel Scott
*Assistant Examiner*—Theophil W. Streule, Jr.
*Attorney, Agent, or Firm*—Duckworth, Hobby, Allen & Pettis

[57] ABSTRACT

A unitary bracket for hanging finned tubes and troughs for a heating and cooling system. The bracket is provided with a fastener for attaching to a wall and has a finned tube support for supporting finned tubing and a drain trough support for supporting a drain line. The support for a drain line has removable segments so that the drain line can be angled over a series of brackets. The bracket also provides for attaching a valance thereover.

11 Claims, 2 Drawing Figures

BRACKET APPARATUS

BACKGROUND OF THE INVENTION

The present invention relates to brackets and especially to brackets for hanging finned tubing and condensate drains for ductless heating and air conditioning systems.

In the past, a great variety of brackets and hooks for tubings and pipes have been provided, such as that taught in U.S. Pat. No. 104,326 for a gas pipe hook which is bolted to a wall for supporting a plurality of spaced pipes, and in U.S. Pat. No. 1,316,255 for a steam pipe hanger which is bolted to a wall for holding a plurality of pipes in different positions. In U.S. Pat. No. 3,599,914, a radiant tube sidewall supporting bracket is illustrated for securing heating tubes to the sidewalls of indirectly heated furnaces, and has a plurality of flanges and webs arranged to support the tubes along a tangential seat. U.S. Pat. No. 3,599,912 by the same inventor teaches a center hung radiant tube support having a plurality of tube supports on a single bracket. U.S. Pat. Nos. 419,112 and 1,334,545 illustrate pipe supports for attaching to a wall for supporting pipes one over the other. U.S. Pat. No. 2,231,462 teaches a pipe bracket which has means for locking a series of pipes to a two-piece bracket which is then supported from the top of the bracket. In U.S. Pat. No. 746,269, a bracket for supporting steam pipes may be attached one over the other, while in U.S. Pat. No. 755,847, an adjustable pipe supporting bracket may be attached to a separate wall anchor, and in U.S. Pat. No. 2,542,442 a tube support allows for supporting the tube and the cushioning members.

In contrast to these prior art patents, the present invention supports tubes to a wall, but has a finned tube directly over a drain trough so that the condensate on the finned tubing can drip into the drain trough and is made so that the bracket can be easily adjusted for maintaining an angle on the drain trough for the condensate to flow therefrom. In addition, the system for attaching a valance cover thereon is provided and the entire bracket is made from a single molded plastic member.

SUMMARY OF THE INVENTION

The present invention relates to a unitary bracket for hanging finned tubes, drain trough, and the like, which has a base support portion, which has a wall fastener formed thereto for attaching the bracket to the wall. A protruding attachment is formed into the bracket for attaching a decorative cover valance, and the bracket is formed to have a tube support for supporting a finned tube in a horizontal position, with one point of the fins angled downward. A drain support supports a drain for collecting and draining condensate from the finned tube. The drain support is divided into a plurality of segments, so that one or more may be snapped off to adjust the angle of the drain for draining the condensate over a series of brackets mounted to a wall. The bracket allows for the quick installation of finned tubing and condensate drains, and for attaching the valance cover all from a single molded plastic bracket, which includes the wall fastening means.

BRIEF DESCRIPTION OF THE DRAWINGS

Other objects, features, and advantages of the present invention will be apparent from the written description and the drawings, in which.

DESCRIPTION OF THE PREFERRED EMBODIMENT

Figure 1:
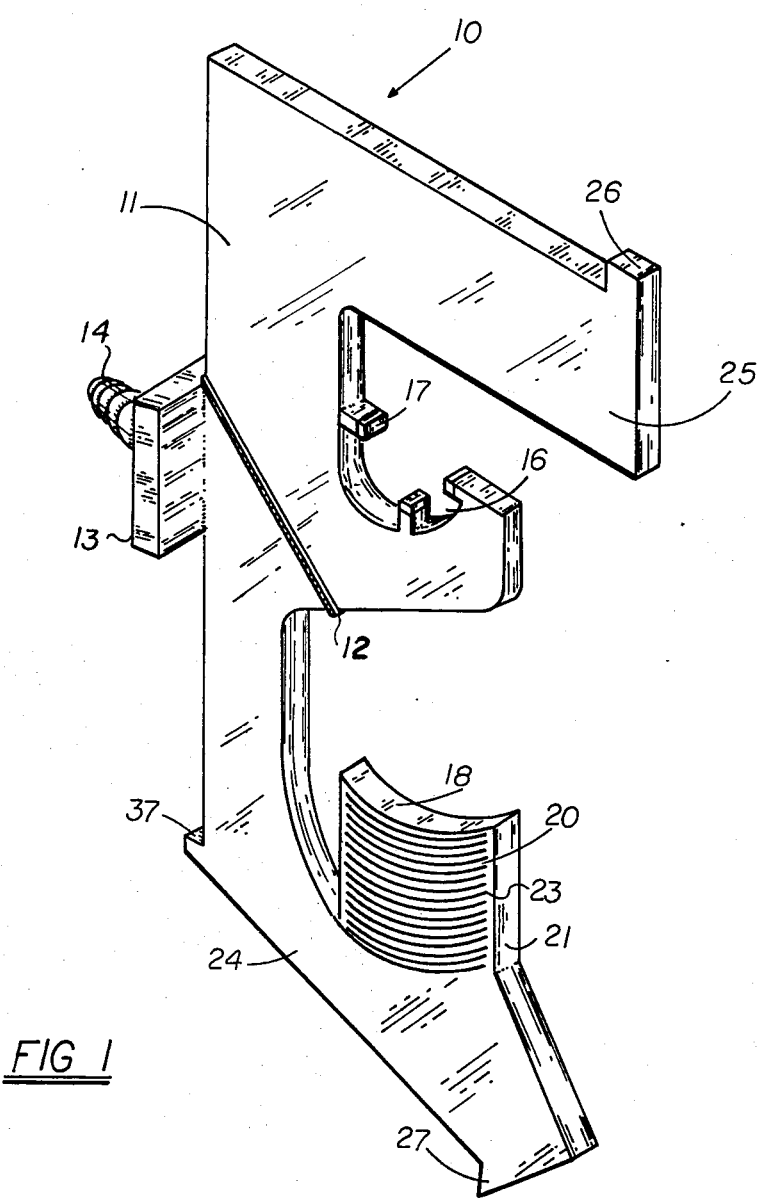
FIG. 1 is a perspective view of a bracket in accordance with the present invention.
Figure 2:
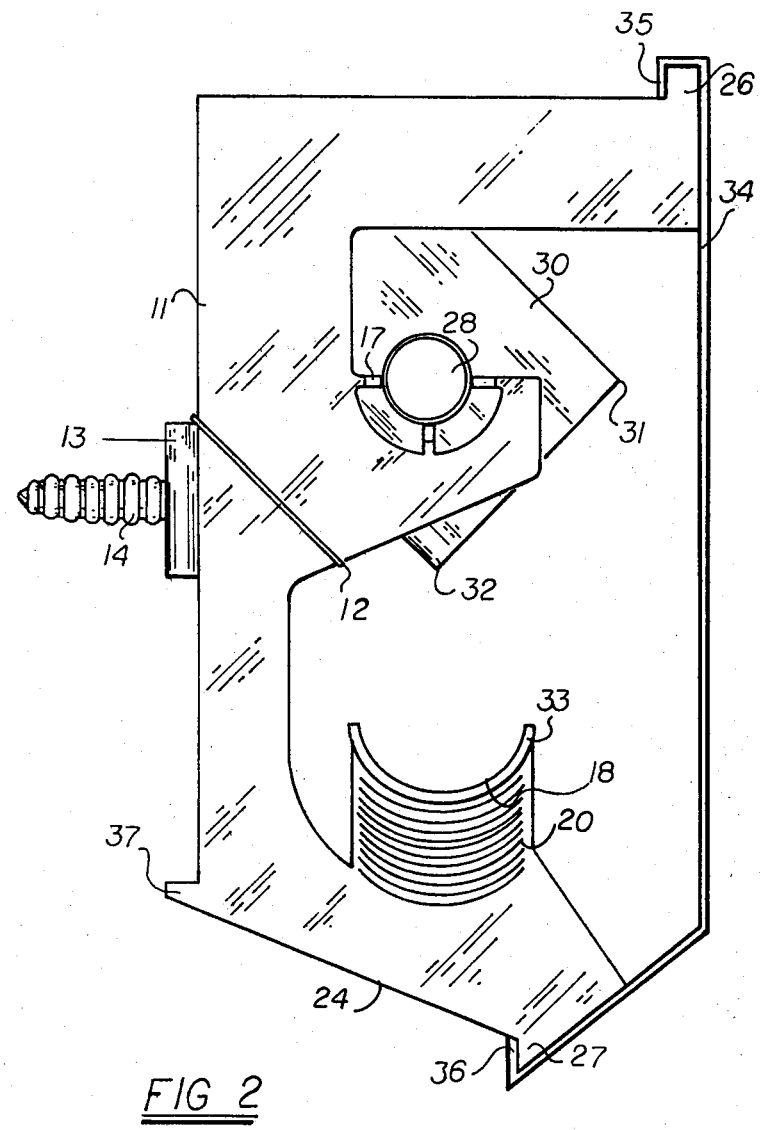
FIG. 2 is a side elevation view having a sectional portion of a finned tube, condensate drain and valance cover mounted thereto.

Referring to the drawings, a unitary support bracket 10 is illustrated made of one piece molded polymer material which has a base support portion 11 having a rib 12 for catching condensate if formed on support 11 and a flanged fastener support 13 fastened thereto. A fastener which may be a threaded screw is illustrated as an elongated fastener member 14 having a plurality of annular locking members 15 therearound so that the fastener member 14 can be driven into an opening of a predetermined size, and will be firmly held by the fastening member. Fastener 10 has a finned tube support portion 16 having three prongs 17 which are scored for supporting either a ⅝ inch diameter or ⅞ inch diameter finned tube thereon by snapping of three tits of plastic, and protruding from the base portion 11. The bracket also has a condensate drain trough support 18 made up of a plurality of segments 20, each connected by an end portion 21 and 22 but having slots 23 passing therethrough to form a segmented support in which any number of the segments 20 can be broken off to adjust the height of the support on the base portion drain support arm 24. This greatly simplifies the adjusting of a condensate drain trough that will sit in the arcuate support 18. The bracket 10 also has an upper valance supporting arm 25 having a valance catch protrusion 26 and a bottom valance supporting catch 27 for snapping a valance over the members 26 and 27 to cover the finned tube and drain from the remainder of a room where the tubes are mounted. The operation of the bracket is more clearly indicated by the elevation view of FIG. 2, in which a finned tube 28 has one or two fins 30 removed therefrom, so that the tube will fit on the supports 17. The fins 31 are angled with one point 32 facing downward over a drain 33 which may be half of a tube supported on the segmented transport 18 so that warm air passing through the cool fins 31 leaving a condensed moisture thereon will drain into the drain 33 and be carried off, since the drain 33 slopes, which slope is adjusted by, for instance, breaking one additional segment 18 off of each succeeding segmented bracket in a series of brackets. Thus, even if the brackets are all mounted in series in a level line, the drain trough can be allowed to slope towards the end of the line. A sectional view of a valance 34 is shown with a top snap portion 35 and a bottom snap portion 36 snapped onto the top valance support catch 26 and bottom valance catch 27 respectively, covering the entire front of the bracket 10, hiding the finned tubes 28 and the drain trough 33. The bracket has a portion 13 attached to the brace portion 11 having the fastener 14 mounted thereto, along with a wall standoff portion 37, which aligns the wall with the flanged portion 13 to hold it level against the wall. The entire bracket 10 is formed, one or more at a time, in an injection mold using a suitable polymer, such that the segments 20 of the drain support 18 can be easily removed with a knife by simply cutting or breaking off at the end strip portions 21 and 22.

It should be clear at this point that a unitary bracket which can be easily and inexpensively manufactured has been provided, which has features for quickly mounting a heating and cooling finned tubing system and drain collection system to the interior walls of a building. However, the present invention is not to be construed as limited to the particular form shown herein, which is to be considered illustrative rather than restrictive.

We claim:

1. A unitary bracket for hanging finned tubes, drain troughs, and the like, comprising in combination:
   a base support portion;
   wall attachment means for attaching said bracket to a wall, said wall attachment means being attached to said base support portion;
   tube support means for supporting a portion of a tube in a predetermined position, said tube support being attached to said base support portion; and
   drain support means for supporting an elongated drain trough for collecting moisture from said tube mounted in said tube support, said drain support means being attached to said base support portion, and having a plurality of connected segments removably attached thereto for adjusting the angle of said drain trough mounted on said drain support means by the removal of segments, whereby a drain can be positioned over a plurality of brackets at an angle determined by the number of segments removed over a series of brackets.

2. The bracket in accordance with claim 1 in which said bracket has a valance attaching means connected to said base support portion for attaching a valance thereto.

3. The unitary bracket in accordance with claim 2, in which each said drain support means segment is an arcuate segment attached to the other segments with a segment connecting portion.

4. The unitary bracket in accordance with claim 3, in which said bracket is a unitary molded polymer member.

5. The unitary bracket in accordance with claim 2, in which said wall attaching means is a wall anchoring fastener molded onto said base support portion.

6. The unitary bracket in accordance with claim 2, in which said tube support means has a plurality of stand-off members protruding from an arcuate surface attached to said base support portion.

7. The unitary bracket in accordance with claim 6, in which there are three standoffs mounted for supporting a tube thereon.

8. The unitary bracket in accordance with claim 2, in which a pair of catch members are mounted to said bracket for attaching a valance over one edge thereof.

9. The apparatus in accordance with claim 8, in which said valance attaching means includes an upper protruding catch and a lower protruding catch.

10. The apparatus in accordance with claim 5, in which said unitary bracket has a wall standoff member for positioning the bracket spaced from a wall a predetermined distance.

11. The bracket in accordance with claim 1 in which said base support portion has a pair of angled ribs thereon for directing any condensate formed on said bracket into a drain trough supported on said drain support means.

* * * * *